(12) United States Patent
Cook et al.

(10) Patent No.: US 12,243,538 B2
(45) Date of Patent: Mar. 4, 2025

(54) INTERACTIVE AIRCRAFT CABIN ENVIRONMENT

(71) Applicant: Gulfstream Aerospace Corporation, Savannah, GA (US)

(72) Inventors: Brian Cook, Savannah, GA (US); Tongan Wang, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 497 days.

(21) Appl. No.: 17/446,701

(22) Filed: Sep. 1, 2021

(65) Prior Publication Data

US 2023/0073759 A1    Mar. 9, 2023

(51) Int. Cl.
*G10L 17/22*      (2013.01)
*B64D 11/00*      (2006.01)
*G10L 17/18*      (2013.01)

(52) U.S. Cl.
CPC .......... *G10L 17/22* (2013.01); *B64D 11/0015* (2013.01); *G10L 17/18* (2013.01); *B64D 2011/0038* (2013.01); *B64D 2011/0053* (2013.01)

(58) Field of Classification Search
CPC ....................................................... G10L 17/22
See application file for complete search history.

(56) References Cited

U.S. PATENT DOCUMENTS

| 7,355,161 B2 * | 4/2008 | Romig | B60J 3/04 |
| | | | 250/221 |
| 2008/0048101 A1 * | 2/2008 | Romig | B64C 1/1476 |
| | | | 250/221 |

(Continued)

FOREIGN PATENT DOCUMENTS

| EP | 3578462 A1 * | 12/2019 | ......... B64D 11/0015 |
| KR | 20220076398 A * | 3/2021 | |

OTHER PUBLICATIONS

Google Machine Translation of European Patent Application No. EP 3 578 462 A1 to Ibrahim that was filed in 2018.*

(Continued)

*Primary Examiner* — Jean Paul Cass
(74) *Attorney, Agent, or Firm* — Lorenz & Kopf, LLP (57) ABSTRACT

The interactive aircraft cabin environment control system employs at least one microphone array disposed within the cabin to capture spoken utterances from a passenger and is configured to provide an estimation of passenger location within the cabin based on arrival time analysis of the spoken utterances. A data source onboard the aircraft provides flight context information. Such data sources include sensors measuring real-time parameters on the aircraft, the current flight plan of the aircraft, singly and in combination. A control processor, coupled to the microphone array, is configured to ascertain passenger identity based on the spoken utterances. The control processor is programmed and configured to learn and associate passenger preference to passenger identity. The control processor is receptive of the estimation of passenger location and is coupled to provide supervisory control over at least one device forming a part of the cabin environment according to passenger location, passenger preference obtained from passenger identity and flight context information.

15 Claims, 4 Drawing Sheets

(56) References Cited

U.S. PATENT DOCUMENTS

| | | | | |
|---|---|---|---|---|
| 2009/0319902 A1* | 12/2009 | Kneller | | H04H 20/62 |
| | | | | 348/E13.001 |
| 2018/0293221 A1 | 10/2018 | Finkelstein et al. | | |
| 2019/0266472 A1 | 8/2019 | Johnson | | |
| 2020/0406906 A1* | 12/2020 | Omari | | G05D 1/0223 |
| 2023/0114137 A1* | 4/2023 | Wu | | A61B 34/20 |
| 2023/0285010 A1* | 9/2023 | Noonan | | A61B 34/20 |
| 2023/0310099 A1* | 10/2023 | Ye | | A61B 90/57 |
| | | | | 606/1 |
| 2023/0310103 A1* | 10/2023 | Noonan | | A61B 90/361 |
| 2023/0310104 A1* | 10/2023 | Alvarez | | A61B 34/25 |
| | | | | 606/1 |

OTHER PUBLICATIONS

Tehrani, Ali, et al., Sound Source Localization Using Time Differences of Arrival; Euclidean Distance Matrices Based Approach, IEEE Xplore, 2018 9th International Symposium on Telecommunications (IST), Dec. 17, 2018 (https://ieeexplore.ieee.org/document/8661037).*

Snyder, David, et al., Deep neural network-based speaker embeddings for end-to-end speaker verification, IEEE explore, 2016 IEEE Spoken Language Technology Workshop (SLT) (2016) (https://ieeexplore.ieee.org/abstract/document/7846260).*

Machine Translation of Korean Patent Application Pub. No. KR 20220164494 A to Cella that was filed in 3-211.*

* cited by examiner

INTERACTIVE AIRCRAFT CABIN ENVIRONMENT

TECHNICAL FIELD

The present disclosure relates generally to automated control using diverse inputs to control plural devices and systems. More particularly the disclosure relates to automated control of aircraft cabins and other enclosed spaces.

BACKGROUND

This section provides background information related to the present disclosure which is not necessarily prior art.

The aircraft cabin of a modern business jet is equipped with a range of different passenger comfort, safety and entertainment systems. These systems each function independently using their own dedicated controls. Traditionally such dedicated controls are manually operated using pushbuttons, knobs and on-screen touch selection. Control by speech is generally less reliable due to the wide variability in background noise levels during the different phases of flight (e.g., take-off, cruise, landing).

SUMMARY

The disclosed system uses a sophisticated multimodal command input system to support interactive control of the cabin environment. A plurality of different devices and systems onboard the aircraft (e.g., lighting, climate control, motorized window shades, gasper air supply, seat incline, etc.) are each controlled by an artificial intelligence equipped control unit. The control unit allows full control over each device or system, individually or in concert. Thus the control unit can adjust the incline of a single seat, and can also control several devices in concert to provide a different mood within the cabin. The disclosed system uses artificial intelligence to recognize crew/passenger's identity on aircraft, which can then be used to customize cabin environment and bring more relevant information to the customers.

The control unit carries out these control functions using a plurality of diverse inputs which include: flight plan, speech recognition, speaker identification, speaker verification, speaker location, user-defined preferences, real-time aircraft and device state information, and controlled device use case state information.

The control unit uses its artificial intelligence to learn from prior usage of the system, thereby increasing the control unit's prediction accuracy.

By using diverse inputs, and knowledge learned from prior uses, the control unit is able to predict with high certainty what commands the user has intended to express, and then formulate a control strategy that meets the user's wishes.

By way of example, the onboard system can automatically apply cabin environment preferences at his/her seated locations, including, but not limited to, settings such as Window shade: Open/Closed
Gasper: On/Off
TV volume
Reading light: On/Off Based on previous requests, the onboard system can bring information that is more relevant to the passenger/crew. For example, "Turn on TV": automatically switch to his/her favorite channel "Local News": brings relevant news, i.e. sports/finance/traffic news "Play Music": plays his/her favorite music "Show map": show traffic, or restaurant or local attractions By way of summary, the disclosed interactive aircraft cabin environment control system employs at least one microphone array disposed within the cabin to capture spoken utterances from a passenger and configured to provide an estimation of passenger location within the cabin based on arrival time analysis of the spoken utterances. A data source onboard the aircraft provides flight context information. Such data sources include sensors measuring real-time parameters on the aircraft, the current flight plan of the aircraft, singly and in combination. A control processor, coupled to the microphone array, is configured to ascertain passenger identity based on the spoken utterances. The control processor is programmed and configured to learn and associate passenger preference to passenger identity. The control processor is receptive of the estimation of passenger location and is coupled to provide supervisory control over at least one device forming a part of the cabin environment according to passenger location, passenger preference obtained from passenger identity and flight context information.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Figures 1, 1A:
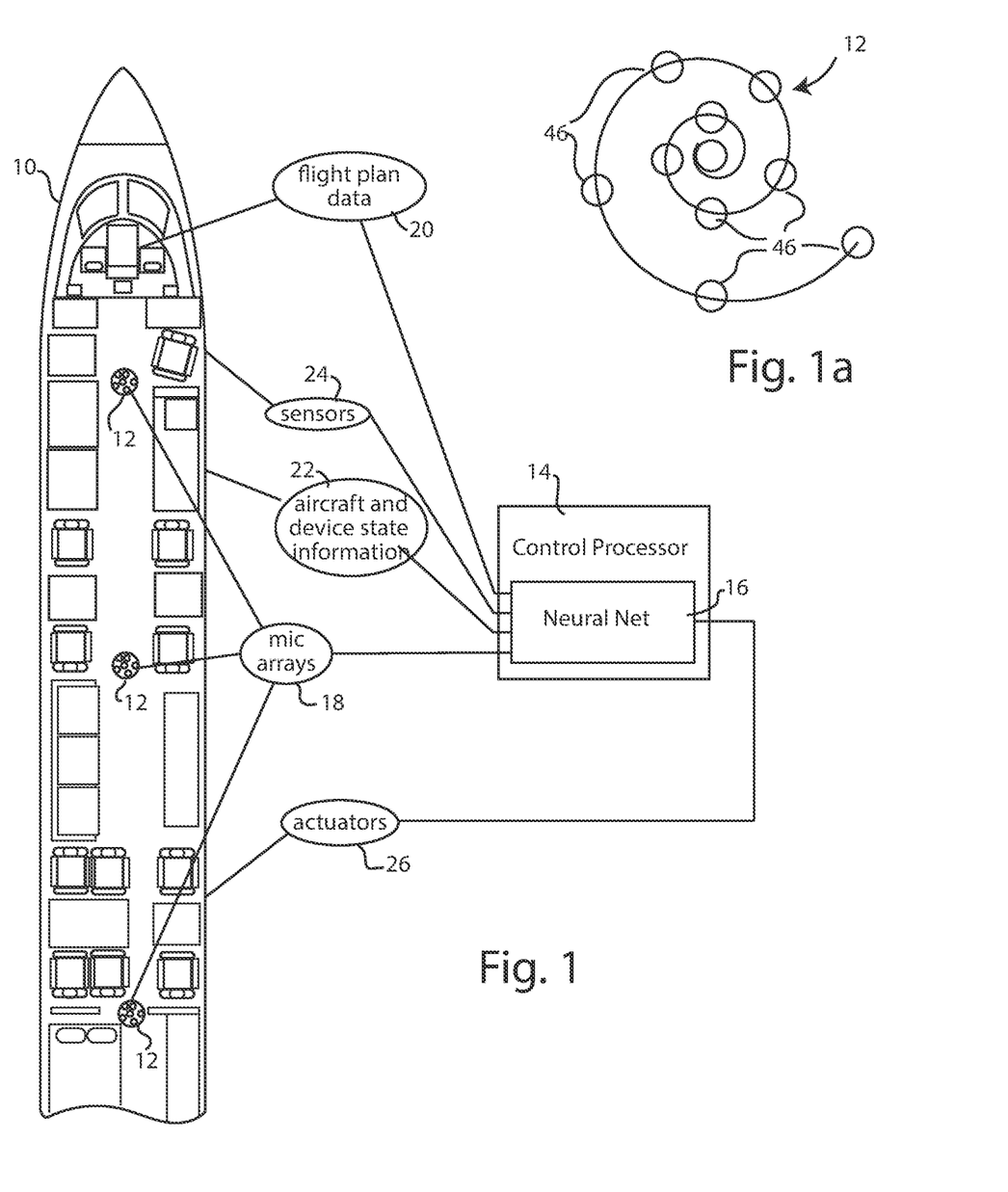
FIG. 1 is a cutaway plan view of a section of an exemplary aircraft, showing microphone array placement and integration of the control unit.
FIG. 1*a* shows an exemplary microphone array in greater detail.

With reference to FIG. 1 an exemplary aircraft 10 is shown in cutaway plan view to reveal an exemplary seating and furniture arrangement within the cabin. The disclosed system is designed to provide interactive control of the cabin environment. By way of example, the system provides interactive control of lighting, cabin temperature, motorized window shades, air gasper setting, seat incline, and in-flight entertainment systems. The interactive environment control system uses multimodal sensors to acquire user input reflecting how conditions within the cabin should be modified to enhance the passenger's comfort and enjoyment of the cabin surroundings.

Among the multimodal sensors used for this purpose are a plurality of microphone arrays 12, which are deployed at distributed points within the cabin, as illustrated in FIG. 1. These microphone arrays 12 each comprise a plurality of individual microphone transducers 46 as shown in FIG. 1*a*.

The transducers are spaced apart by a known separation distance which allows time of arrival information to be used to locate the point of origin of sounds picked up by the microphone array. Further details on how this is done are discussed below in connection with FIGS. 3 and 4. Although a spiral microphone array is featured in FIG. 1a, the microphone array can be in any other pattern, such as linear, circular, rectangular etc.

At the heart of the interactive environment control system is a control processor 14, which in one embodiment includes a neural network 16. As will be more fully described below, the control processor receives inputs from a plurality of different sensors and data sources, including the microphone arrays 12. From these input data the control processor determines how the passenger wishes to modify the cabin environment. Such modification can comprise something as simple as turning on or off a single device, such as a cabin reading light, or something quite complex, such as lowering the window shades, adjusting the brightness and color temperature of the ambient lighting, switching the in-flight entertainment system to a program of a particular passenger's preference and adjusting the cabin temperature in the space that passenger is seated. The control processor sends control signals to a collection of actuators 26 attached to embedded into each of the controlled devices on the aircraft.

In addition to passenger speech commands, picked up by the microphone arrays 12, the control processor 14 also derives inputs from the flight plan data 20, obtained from the aircraft's flight control computer, and inputs providing aircraft and device state information 22 and other sensor data 24.

Aircraft state information: Examples of aircraft state information include aircraft GPS location, including elevation, yaw, pitch and roll angle, cruising speed, and ground velocity. These data, in combination with the flight plan data give the control processor information from which time of arrival can be estimated. Such information can be used to prepare the cabin environment for landing, by adjusting lighting and alerting occupants to the anticipated time of touch down. Aircraft state information may also include environmental factors such as cabin temperature, humidity and outside air temperature, which the control processor uses to maintain the passenger's specified cabin temperature.

Device state information: Examples of device state information 22 include for each controlled device the current operating state and current settings or setting position within a device operating menu tree structure. As will be discussed, such device state information may be stored as object-oriented state variables referenced to a tree structure representing all possible operating modes and states of each device. By way of example, a simple reading light may have a simple tree structure comprising a single node which stores one of two states: On and Off. A more complex device such as an audio-video entertainment system would have a multi-node tree structure with nodes representing every state of the device's entire operating menu structure.

Other sensors: Examples of sources providing other sensor data 24 include Bluetooth or WiFi data communicated from passenger personal devices such as laptop computers, tablets and mobile phones.

Neural Network Training

The control processor 14 uses its neural network 16 to determine the cabin environment wishes of the passengers. The neural network is trained using data on how specific passengers have fine-tuned their cabin environments under a range of different flight scenarios in the past. Initially the neural network 16 is trained using baseline training data on how a corpus of passengers have fine-tuned their cabin environments. The corpus of passengers may be assembled through focus group research, or the corpus of passengers may be aggregated using data from a fleet of aircraft in actual flight conditions. Once the neural network 16 is initially trained, it will refine its neuron weights based on how particular passengers choose to fine-tune the environment.

Fine-tuned training is possible because the neural network implemented in the control processor includes or implements a speaker identification and verification system. The neural network 16 is able to recognize a particular passenger through his or her speech characteristics, and will also verify that the speaker is not an impostor. Once the speaker's identity is determined and verified, then the speaker's identity is used as part of the training data for the neural network, such that over time, the neural network will learn each particular passenger's preferences. This ability to learn individual preferences is highly desirable in private business aircraft where the population of passengers is relatively small. However, the ability to learn individual preferences may also be applied on commercial aircraft, by taking language preferences into account. Thus, on a flight to another country or continent, the neural network would readily be able to control entertainment media selection based on the sounds of the passenger's spoken language, learned by listening to the passengers' speech.

Speaker Identification and Verification

Figure 2:
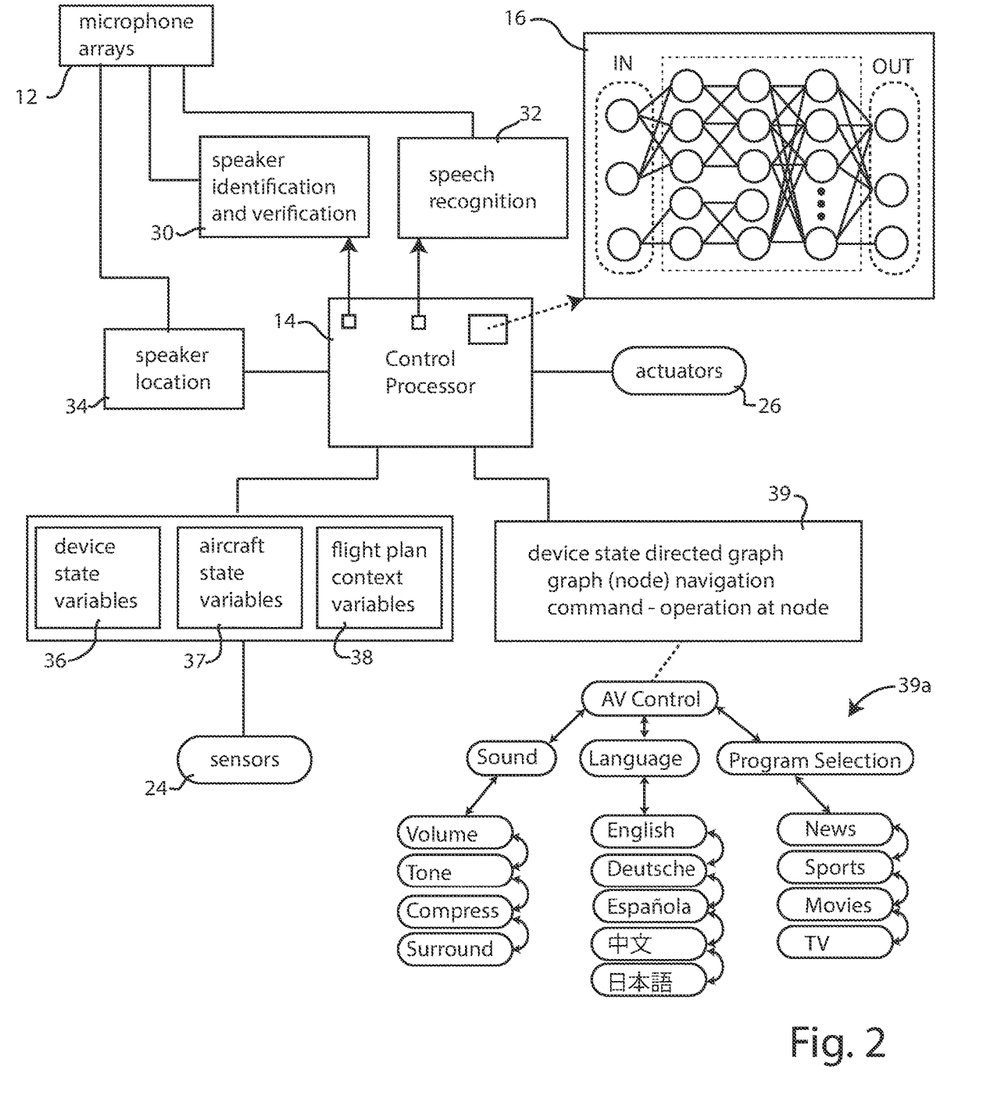
FIG. 2 is a functional block diagram of the control unit and associated sensors, actuators and data structures.

Referring now to FIG. 2, the control processor 14 includes a speaker identification and verification component 30 which may be implemented either as a standalone speech processing circuit or as a collection of neuron layers forming part of the neural network 16. The speaker identification component is used to associate subsequent utterances from a speaker to a specific person. In this way the control processor is able to provide customized cabin environment control based on that person's learned preferences. Speaker identification can be as simple as having the person state his or her name, or perhaps name and a passphrase known only to that person. However, to make the recognition system more secure, a speaker verification component is included in component 30. Verification is performed by comparing selected features from the current utterance with stored features from prior verified utterances of that speaker.

The speaker identification and verification component not only associates the speaker with a set of learned preferences, it also provides the speech recognition component 32 with a set of trained recognition models that have been custom trained to recognize the speech of that particular person with a high degree of reliability.

Speaker Location

While passenger speech commands supply an important input, and one that factors heavily in the control decisions made by the control processor, there are other important inputs. Speaker location supplies another important input, which is useful to the control processor in determining the context of a passenger's desired result. For example, if the passenger utters "raise the window shade," the control processor uses the passenger's location to determine which shade to raise. Similar context information is used to control the in-flight entertainment system, the seat mechanism, the air gasper, overhead reading lights, and the like.

Speaker location is derived from the acoustic data captured by the microphone arrays. Time of arrival information is used to triangulate on the speaker's location. Thus as illustrated diagrammatically in FIG. 3 utterance 42a arrives at a first transducer 46a before utterance 42b arrives at transducer 46b. A signal processor within a speaker location circuit, bundled with the microphone array or located elsewhere, performs correlation on the sounds received by each transducer, in order to identify that utterances 42a and 42b represent the same utterance event, simply received at different times. By subtracting the arrival times of the respective received utterance signals, the time difference dt is computed by the processor. The position or location of the utterance origin is then calculated from this calculated time difference dt.

Figure 4:
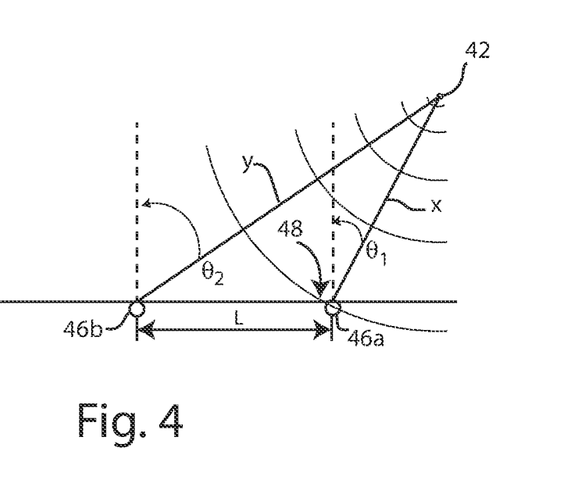
FIG. 4 is a diagram illustrating how the geometric origin of the wavefront of the uttered sound may arrive at the pair of microphone transducers from different apparent angles.

FIG. 4 illustrates how the computed difference dt in arrival times at the transducers 42a and 42b may be used to determine not only general direction from which the utterance came, but also, through triangulation, the precise position or location of the origin of the utterance 42. In FIG. 4, the utterance originates at 42 and acoustically propagates in a spherical wavefront, depicted by the expanding arced lines in FIG. 4. As illustrated, the wavefront at 48 passes across and is received by transducer 46a, before it passes across and is received by transducer 46b. The spacing L between transducers 46a and 46b is fixed. Thus, the line-of-sight distance x from the utterance origin 42 to transducer 46a is shorter than the line-of-sight distance y, by an amount equal to the additional distance the wavefront propagated to 46b during the calculated delay time dt. In other words, the distances from the utterance origin 42 to the respective transducers 46a and 46b can be related knowing the calculated or measured time delay dt and the speed of sound c within the aircraft cabin, as follows:

$$y = x + dt \times c$$

Figure 3:
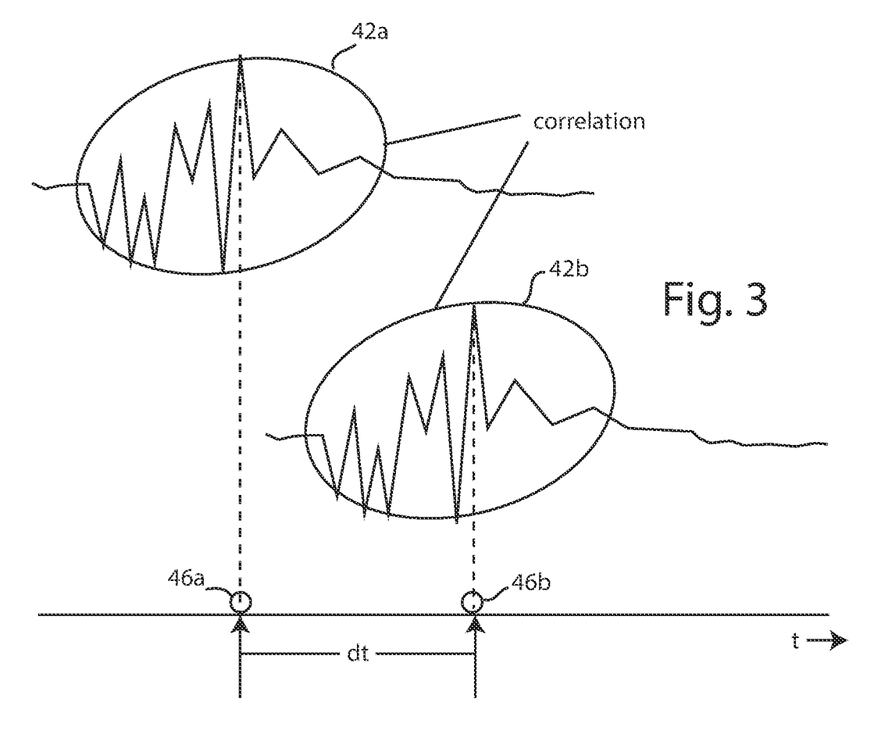
FIG. 3 is a waveform diagram illustrating how different time of arrival of the same uttered signal can be measured.

Having calculated the difference between distances x and y, and knowing the fixed spacing L, as well as the known locations of microphone transducers 46a and 46b, the direction and position of the utterance origin 42 can be determined. If desired, the position of the utterance origin can be expressed using an angular measure. In FIG. 4, such angular measures are shown at 01 and 02 measured relative to a line orthogonal to the plane in which the transducers 46a and 46b lie. It will be appreciated that FIGS. 3 and 4 are intended simply to show conceptually how the utterance origin is related to the arrival time at plural transducers whose position and spacing are known. There are a variety of computational techniques that may be used to determine direction of arrival, and spatial position or location of the utterance origin. One embodiment of doing so is to program the processor to identify the utterance origin by maximizing the generalized cross correlation phase transform (GCC-PHAT) function.

Returning to FIG. 2, the control processor 14 obtains sensor data 24, which include device state variables 36, aircraft state variables 37 and flight plan context variables 38. These sensor data may be obtained as live data from various sensors and systems on the aircraft. These data may be obtained and stored in memory buffers for use by the control processor 14.

The control processor 14 also maintains a data structure that stores metadata describing all of the controllable operating states of each controlled device on the aircraft. This may be implemented as a device state directed graph 39, which describes all of the possible operating states of a device and the path by which one would traverse from state to state using the user interface of that device.

By way of example, the directed graph 39a of a portion of an audio-video player might have a directed graph having nodes for sound control, language control and program selection. Each of these nodes would present child nodes through which a user can traverse to make his or her selections.

The control processor 14 uses this directed graph to determine how to operate a controlled device by sending control commands that mimic what a user would enter to make a particular selection or setting, following the directed graph for that device. At each leaf node the control processor stores the setting value according to the user's command (if any). If no command for a particular value has been sent, then nominal default values are stored. By way of example, in the audio-video directed graph 39a, the following exemplary values might be stored:

---

Volume: 52%
Tone: +5
Compress: On
Surround: Off
Language: English
Program Selection: News

---

The values stored in the directed graph reflect the desired user settings, as ascertained by the neural network 16. The actual settings for the controlled devices are reflected by the device state variables 36. The control processor 14 will send control commands to adjust device settings, as needed, until the actual settings match the desired user settings.

Dialog Semantic Analysis

Figure 5:
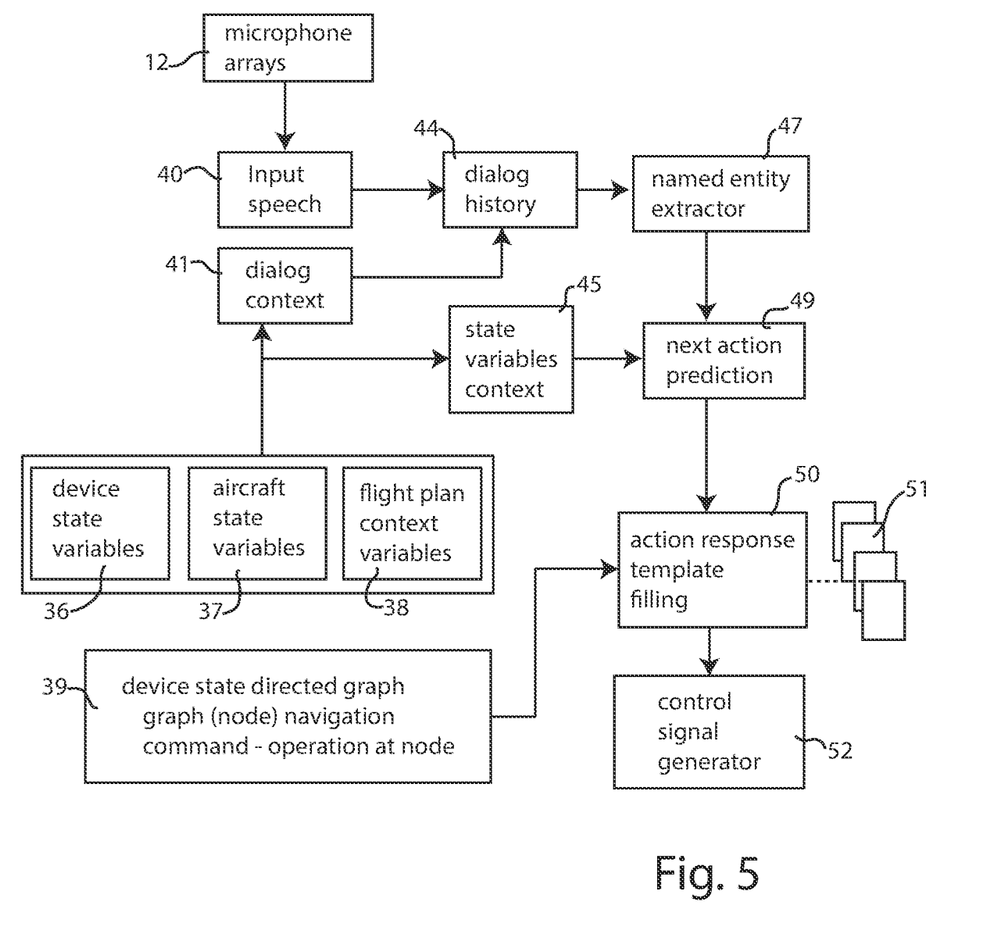
FIG. 5 is a functional block diagram illustrating how control messages are processed.

To generate the proper device control signals, the control processor 14 must extract the meaning (semantics) from the passenger utterances, in context of the passenger's location and in context of the state of the aircraft, the flight plan and the states of relevant devices to be controlled. This is accomplished by dialog semantic analysis, performed by the control processor 14 using neural network 16, as illustrated in FIG. 5.

Spoken utterances are captured by microphone arrays 12 and converted into input speech data 40, using the speech recognition component 32 (FIG. 2) of the neural network. Meanwhile dialog context data 41 are captured from the device state variables 36, the aircraft state variables and the flight plan context variables 38 (collectively the state variables context 45). The input speech data 40 and dialog context data 41 correspond to a stream of data, ever-changing with the passage of time. Thus, the control unit defines a time-correlation relationship between the input speech data and the context data and performs segmentation on these data streams to define temporal segments or windows, stored as a dialog history 44, upon which dialog semantic analysis is performed.

First steps in the semantic analysis are to identify and extract named entities which correspond to objects to be controlled, as at 47 and to predict what processes to carry out such control, as at 49. In grammatical terms, the named entities may be thought of as the direct objects and verbs making up a control command. Named entity extraction 47 and next action prediction 49, operating upon the phrase, "dim my reading light," would identify the direct object: reading light and the verb: dim. Of course, it will be understood that the foregoing is a very simple example to illustrate the concept of named entity extraction and next action prediction. The neural network 16, after having been fully trained, is capable of extracting meaning from far more complex sentences, taking into account a dialog history that has evolved up to the current utterance.

To give meaning to the extracted entities and predicted actions, the control processor 14 using its neural network 16, fills or populates an action response template 50. The template can be thought of as a predefined control process that operates on an extracted entity using the predicted action, as determined by operations at 47 and 49. The control processor 14 may employ a template library 51 containing hundreds or thousands of such templates in order to bring about precise and often subtle changes in cabin environment. These templates are akin to recipes for how to produce a desired cabin environment result. Because many of these templates or recipes ultimately need to control actual devices within the aircraft, the template filling process 50 has access to the stored library of device state direction graphs 39. The template filling process would select the applicable device state direction graphs, based on the named entities extracted and based on the next action processes that need to be performed.

The dialog semantic analysis process starts with information (often spoken utterances) from a passenger and information about the current cabin environment state and then formulates a strategy for changing the current cabin environment state, using the action response templates to guide how the change shall occur. In essence the action response templates capture the essentials of what each controlled device is capable of.

Implementation

In implementing the described range functions, the tasks described herein may be shared across different processing devices: general purpose microprocessor devices, digital signal processing (DSP) devices, and one or more trained neural network devices. The choice of which device to use depends on the nature of the process being performed.

For example, some processes such as capturing speech from the microphone arrays and determining speaker location, may be well suited for computation using programmed processors such as digital signal processors. Speaker identification and verification and speech recognition can be performed either by dedicated speech processors, or these functions can be performed by portions of the trained neural network. Collecting and maintaining a data store of device state variables, aircraft state variables and flight plan context variables are tasks well suited to be performed using a programmed microprocessor. Similarly, storing and maintaining the device state directed graph and the library of templates used by the action response template filling process may also be performed using a programmed microprocessor. The dialog semantic analysis is well suited to be performed by the neural network. Ultimately, control signals sent to the devices being controlled can be mediated by a microprocessor programmed to issue the appropriate control instructions through the interface (application program interface) of each controlled device.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An interactive aircraft cabin environment control system comprising:
    at least one microphone array disposed within the cabin to capture spoken utterances from a passenger;
    data storage onboard the aircraft to store cabin environment preferences that indicate passenger-specific settings for a controllable cabin environment;
    a control processor coupled to the at least one microphone array and to the data storage, the control processor being programmed and configured to:
        analyze the spoken utterances captured by the at least one microphone array to ascertain identity of the passenger;
        analyze the spoken utterances captured by the at least one microphone array to determine a current onboard location of the passenger;
        obtain passenger-specific cabin environment preferences for the passenger, based on the ascertained identity of the passenger, wherein the passenger-specific cabin environment preferences indicate passenger-customized settings for controllable devices and systems that form a part of the controllable cabin environment;
        analyze the spoken utterances captured by the at least one microphone array to detect a command or request to control at least one device or system of the controllable cabin environment; and
        selectively apply the obtained passenger-specific cabin environment preferences for the passenger, based on the determined current onboard location of the passenger, wherein the selectively applied passenger-specific cabin environment preferences indicate passenger-customized settings for a controllable device or system positioned at or near the determined onboard location of the passenger, wherein the control processor provides supervisory control over the controllable device or system positioned at or near the determined onboard location of the passenger.

2. The control system of claim 1, further comprising a data source onboard the aircraft providing flight context information, wherein:
    the flight context information comprising real-time parameters of the aircraft and/or a current flight plan of the aircraft; and
    at least some of the selectively applied passenger-specific cabin environment preferences indicate passenger-customized settings for the passenger that are based on the flight context information.

3. The control system of claim 1, wherein the control processor includes a neural network trained to perform as least one of speaker identification and speaker verification.

4. The control system of claim 1, wherein the control processor includes a neural network configured to learn at least some of the cabin environment preferences.

5. The control system of claim 1, wherein the control processor includes a neural network configured to learn at least some of the cabin environment preferences based on spoken utterances in context of flight context information.

6. The control system of claim 1, wherein the control processor is programmed to provide supervisory control using a device state data structure which stores information about a set of predetermined operating states of the controllable device or system positioned at or near the determined onboard location of the passenger.

7. The control system of claim 6, wherein the device state data structure is a directed graph having nodes representing different operating states and edges representing permitted state transitions of the controllable device or system positioned at or near the determined onboard location of the passenger.

8. The control system of claim 1 wherein the controllable device or system positioned at or near the determined onboard location of the passenger is associated with a designated seat location within the aircraft.

9. The control system of claim 1, wherein the control processor is configured to use plural and diverse inputs selected from the group consisting of speech recognition, aircraft state information, device state information, flight plan context and combinations thereof in combination with passenger preference to predict a desired cabin environment and formulate a control strategy for supervisory control over the cabin environment.

10. The control system of claim 1, wherein the control processor is configured to control plural devices in concert using an overall supervisory control strategy to produce different cabin environments.

11. The control system of claim 1, wherein the control processor is configured to control plural devices in concert using an overall supervisory control strategy to produce different cabin environments for different phases of a flight.

12. The control system of claim 1, wherein the control processor is configured with different control interfaces to perform supervisory control over a diverse plurality of devices selected from the group consisting of window shade, window tint, gasper, entertainment system audio volume, entertainment system channel, seat incliner, reading light and cabin ambient lights.

13. The control system of claim 1, wherein the control processor is configured to predict device settings that are not literally expressed in spoken utterances from the passenger.

14. An automated computer-based method of operating an interactive aircraft cabin environment control system comprising at least one microphone array disposed within a cabin of an aircraft, data storage onboard the aircraft to store cabin environment preferences that indicate passenger-specific settings for a controllable cabin environment of the aircraft, and a control processor coupled to the at least one microphone array and to the data storage, the control processor being programmed and configured to perform operations including:
   analyzing spoken utterances of a passenger to ascertain identify of the passenger, the spoken utterances captured by the at least one microphone array;
   analyzing the spoken utterances captured by the at least one microphone array to determine a current onboard location of the passenger;
   obtaining passenger-specific cabin environment preferences for the passenger, based on the ascertained identity of the passenger, wherein the passenger-specific cabin environment preferences indicate passenger-customized settings for controllable devices and systems that form a part of the controllable cabin environment;
   analyzing the spoken utterances captured by the at least one microphone array to detect a command or request to control at least one device or system of the controllable cabin environment; and
   selectively applying the obtained passenger-specific cabin environment preferences for the passenger, based on the determined current onboard location of the passenger, wherein the selectively applied passenger-specific cabin environment preferences indicate passenger-customized settings for a controllable device or system positioned at or near the determined onboard location of the passenger, and wherein the control processor provides supervisory control over the controllable device or system positioned at or near the determined onboard location of the passenger.

15. The method of claim 14, wherein the control processor is further configured to obtain flight context information provided by a data source onboard the aircraft, wherein:
   the flight context information comprises real-time parameters of the aircraft and/or a current flight plan of the aircraft; and
   at least some of the selectively applied passenger-specific cabin environment preferences indicate passenger-customized settings for the passenger that are based on the flight context information.

* * * * *